(12) United States Patent
Shepherd et al.

(10) Patent No.: US 8,169,667 B2
(45) Date of Patent: May 1, 2012

(54) PERFORMING HALFTONING BY PLURALITY OF HALFTONING MECHANISMS

(75) Inventors: Matthew A. Shepherd, Vancouver, WA (US); Marc Yousey, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 702 days.

(21) Appl. No.: 12/395,639

(22) Filed: Feb. 28, 2009

(65) Prior Publication Data

US 2010/0220362 A1 Sep. 2, 2010

(51) Int. Cl.
*H04N 1/405* (2006.01)
*G06K 15/02* (2006.01)
*G06K 9/54* (2006.01)
(52) U.S. Cl. .................. 358/3.06; 358/1.2; 382/304
(58) Field of Classification Search .............. 358/3.06, 358/1.2, 1.9, 521, 534, 1.6, 1.17, 502, 3.23; 347/15; 382/270, 304
See application file for complete search history.

(56) References Cited

U.S. PATENT DOCUMENTS

| 5,553,165 | A | 9/1996 | Webb et al. |
|---|---|---|---|
| 5,892,851 | A | 4/1999 | Nguyen |
| 6,130,661 | A | 10/2000 | Ilbery |
| 6,204,933 | B1 | 3/2001 | Yoshino et al. |
| 7,086,712 | B2 * | 8/2006 | Abello .................. 347/15 |
| 2006/0120787 | A1 | 6/2006 | Abello |
| 2008/0239338 | A1 | 10/2008 | Bailey et al. |
| 2008/0278738 | A1 | 11/2008 | Miyake |

FOREIGN PATENT DOCUMENTS

EP 1555803 A2 7/2005

* cited by examiner

*Primary Examiner* — Charlotte M Baker (57) ABSTRACT

A controller is to receive a halftoning job having a number of pages. The controller is to divide each page into a number of sections. A number of halftoning mechanisms correspond in number to the number of sections into which each page is to be divided. Each halftoning mechanism is to perform halftoning on a different section of each page. At any given time, no halftoning mechanism is to perform halftoning on a same page on which any other halftoning mechanism is to currently perform halftoning.

13 Claims, 6 Drawing Sheets

PERFORMING HALFTONING BY PLURALITY OF HALFTONING MECHANISMS

BACKGROUND

Images are typically represented as two-dimensional matrices of picture elements, or pixels. Each pixel has an intensity level for each color component of the image. For example, a grayscale image may have pixels that each has an intensity level for a gray color component. By comparison, a color image may have pixels that each has intensity levels for red, green, and blue color components, or may have pixels that each has intensity levels for cyan, magenta, yellow, and black color components.

Printing devices, such as inkjet printers and laser printers, are commonly binary devices. For each pixel location on a printed medium, a binary printing device can print at one of two levels for each color component, on or off. Pixels having more than two levels of intensity for each color component thus have to be converted to pixels having only two levels of intensity for each color component. This conversion is known as halftoning; one common type of halftoning is error diffusion.

DETAILED DESCRIPTION

Performing halftoning can be a slow process. This is because for many types of halftoning, such as error diffusion, whether the intensity level of a pixel is converted to one of just two intensity levels (i.e., on or off) is dependent upon the intensity levels of one or more neighboring pixels. One approach to increasing the performance of slow processes is to employ parallelism. In parallelism, a given process is divided into a number of sub-processes that are completed in parallel (i.e., concurrently, simultaneously, or at the same time). In general, for a given process that takes N time to complete in a non-parallel manner, parallelizing the process over M sub-processes can reduce completion time to as little as N/M where no parallelization overhead is taken into account.

Unfortunately, however, halftoning is a process that typically resists easy parallelization. This is because of the nature of many types of halftoning noted above, in which the intensity level of a pixel is converted to on or off dependent upon the intensity levels of one or more neighboring pixels. As such, an image of pixels cannot easily be divided into different pixel groups for parallel halftoning, because the halftoning of the pixels of one pixel group will likely be dependent on the pixels of another pixel group.

The inventors have thus formulated a novel and elegant solution to this difficulty. The inventors have come up with an approach to parallelize nearly any type of halftoning process that considers the neighboring pixels of each pixel. This approach is described in detail in various embodiments in the subsequent portions of the detailed description. In general, halftoning is performed in parallel by having the halftoning mechanisms perform parallel halftoning on different pages of a halftoning or print job. As such, because at any given time at most one halftoning mechanism is performing halftoning on a given page, parallelization of nearly any type of halftoning process that considers the neighboring pixels of each pixel is amenable to the inventors innovative approach. In some embodiments, for a given page to be halftoned by M halftoning mechanisms operating in parallel, the time to perform halftoning is reduced to as little as 1/M of the time needed to perform halftoning by just one of these mechanisms, where no parallelization overhead is taken into account.

Figure 1:
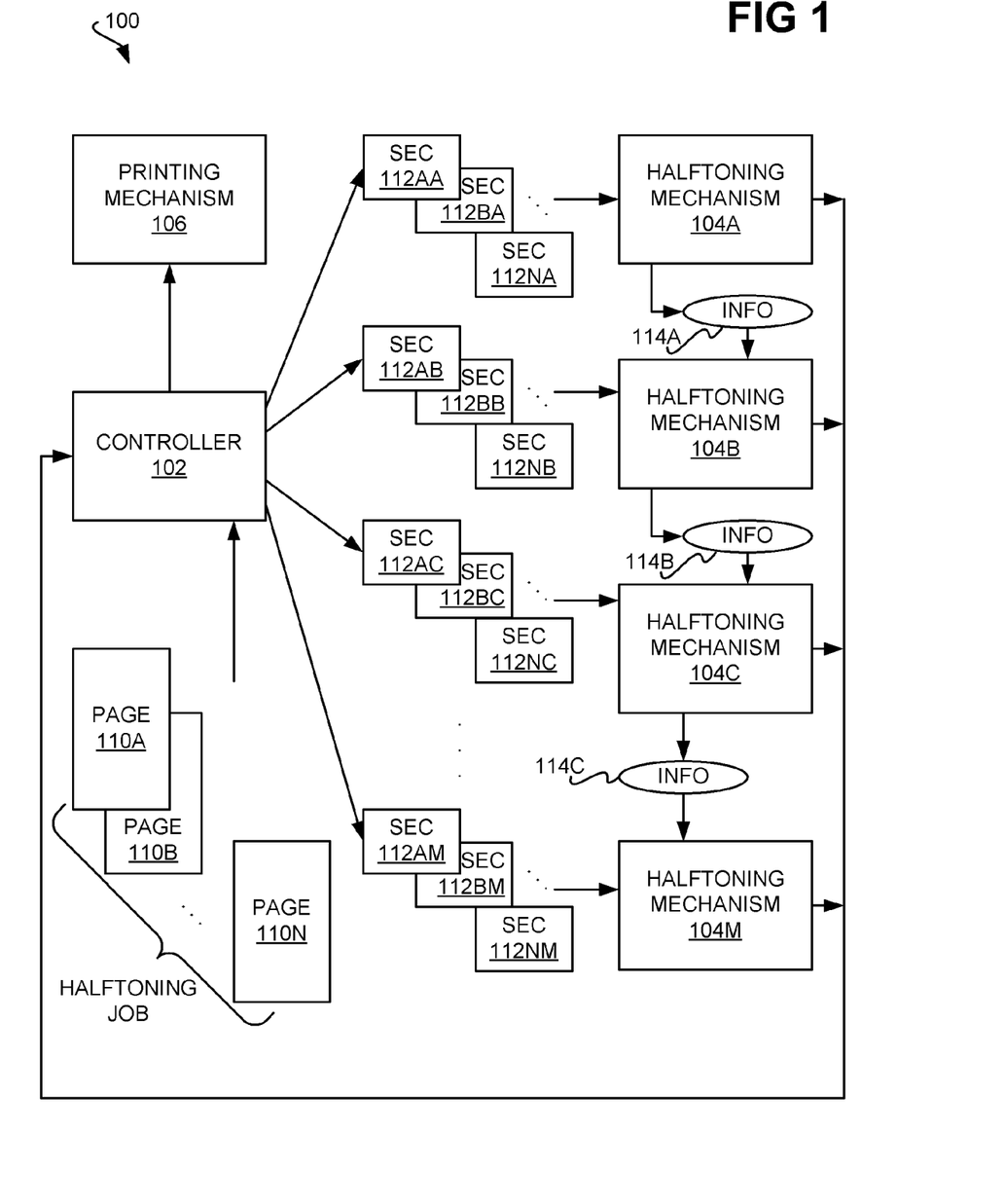
FIG. 1 is a diagram of a halftoning system, according to an embodiment of the present disclosure.

FIG. 1 shows a halftoning system 100, according to an embodiment of the present disclosure. The system 100 includes a controller 102 and a number of halftoning mechanism 104A, 104B, 104C, . . . , 104M, collectively referred to as the halftoning mechanisms 104. The halftoning mechanisms 104 are said to be ordered from a first halftoning mechanism 104A to a last halftoning mechanism 104M. The system 100 may also include a printing mechanism 106, such as an inkjet-printing mechanism or a laser printing mechanism, which is capable of printing images on sheets of media like paper, where the images may include texts, graphics, and/or other types of image data.

In one embodiment, the controller 102 and the halftoning mechanisms 104 may be implemented on one or more computing devices including hardware and/or software, and the printing mechanism 106 may be implemented on a printing device that is different than these computing devices. In another embodiment, the controller 102, the halftoning mechanisms 104, and the printing mechanism 106 may be implemented on the same device, such as a printing device, having hardware and/or software. Thus, embodiments of the present disclosure are not limited to as the types of architectural topologies in relation to which the system 100 is implemented. Some exemplary representative such architectural topologies are described in a subsequent section of the detailed description, however.

The controller 102 receives a halftoning job 108, which may be a print job to ultimately be printed by the printing mechanism 106. The halftoning job 108 is made up of a number of pages 110A, 110B, . . . , 110N, collectively referred to as the pages 110. Each of the pages 110 includes image data corresponding to an image to ultimately be printed on a sheet of media by the printing mechanism 106. The image data is organized into pixels. Each pixel has an intensity value for one or more color components, such as a grayscale component, or red, green, and blue components, or cyan, magenta, yellow, and black components. The intensity value for each color component of each pixel is set to one of a number of different values greater than two. As such, halftoning is performed on the image data of the pixels 110 to convert the intensity value for each color component of each pixel to one of two different values, such as on or off.

Figure 2:
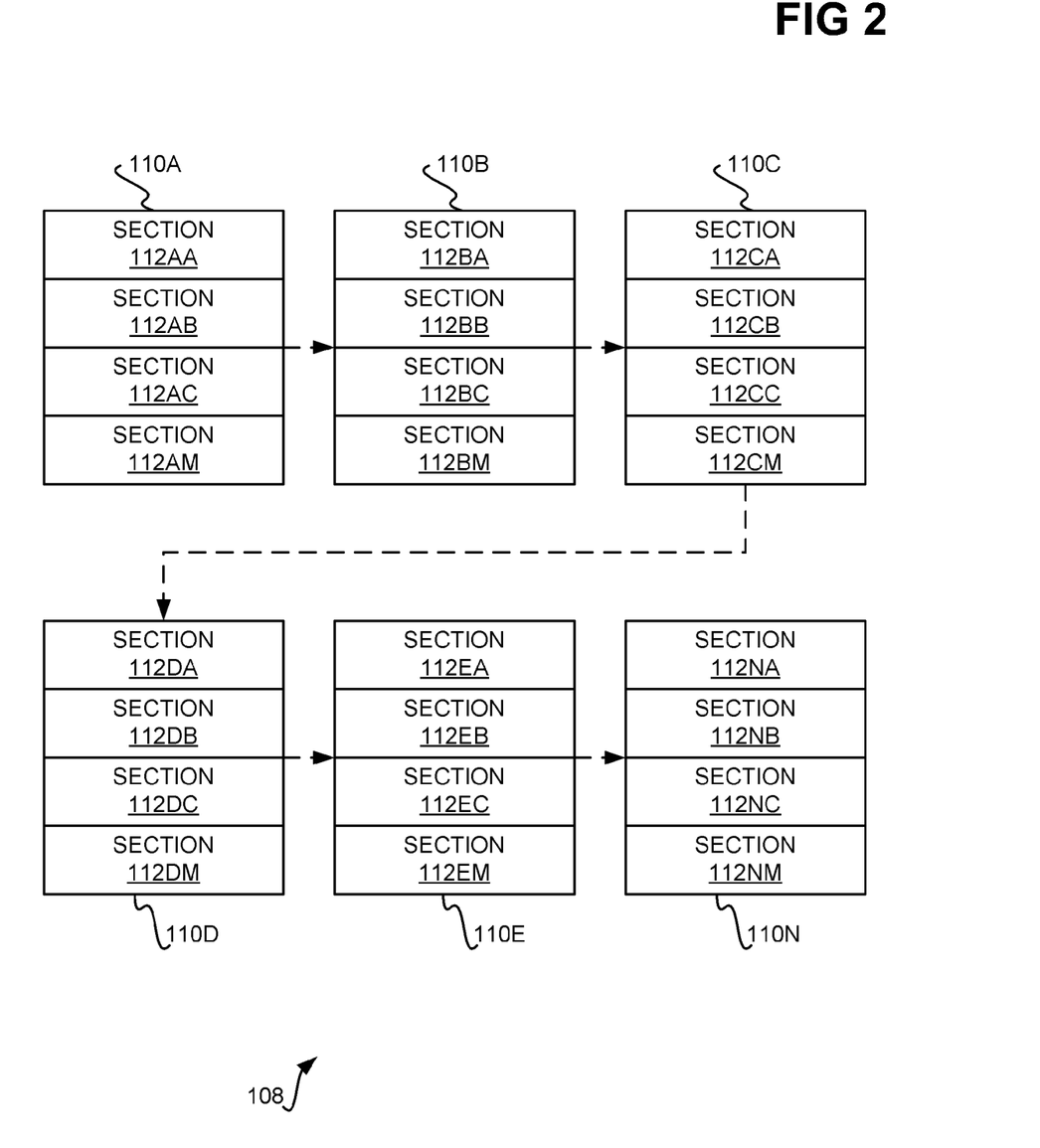
FIG. 2 is a diagram depicting how the pages of a halftoning job can be divided into sections that correspond in size and in location, according to an embodiment of the present disclosure.

The controller 102 divides each of the pages 110 into sections equal in number to the number of halftoning mechanisms 104. In some embodiments, the sections of each page correspond in location and in size to the sections of each other page; however, in other embodiments, the sections of each page do not correspond in location and/or do not correspond in size to the sections of each other page. FIG. 2 shows the exemplary division of the pages 110 into sections, according to an embodiment of the present disclosure. In the example FIG. 2, there are six pages 110A, 110B, 110C, 110D, and 110N (such that the number of pages N equals six), ordered from the first page 110A and to the last page 110N as indicated by the dotted-line arrows in FIG. 2. There is further presumed to be four halftoning mechanisms 104A, 104B, 104C, and 104M (such that the number of mechanisms M equals four). Therefore, each of the pages 110 is divided into four sections.

For example, the page 110A is divided into sections 112AA, 112AB, 112AC, and 112AM. This means that the pixels of the image data of the page 110A are divided into the sections 112AA, 112AB, 112AC, and 112AM based on whether each such pixel is located on the page 110A in the section 112AA 112AB, 112AC, or 112AM. Likewise, the page 110B is divided into sections 112BA, 112BB, 112BC, and 112BM, meaning that the pixels of the image data of the page 110B are divided into the sections 112BA, 112BB, 112BC, and 112BM based on whether each such pixel is located on the page 110B in the section 112BA, 112BB, 112BC, or 112BM. Likewise, the page 110C is divided into sections 112CA, 112CB, 112CC, and 112CM; the page 110D is divided into sections 112DA, 112DB, 112DC, and 112DM; the page 110E is divided into sections 112EA, 112EB, 112EC, and 112EM; and, the page 110N is divided into sections 112NA, 112NB, 112NC, and 112NM.

As noted above, the sections 112 of the pages 110 correspond in location and in size. This means that the sections 112AA, 112BA, 112CA, . . . , 112NA correspond to one another, are located in the same place on their respective pages 110, and have the same size on their respective pages. More specifically, the section 112AA is located at the top quarter of the page 110A and has a size equal to a quarter of the page 110A, the section 112BA is located at the top quarter of the page 110B and has a size equal to a quarter of the page 110B, and so on. Likewise, the sections 112AB, 112BB, 112CB, . . . , 112NB correspond to one another, and are located in the same place and have the same size on their respective pages. Finally, the sections 112AC, 112BC, 112CC, . . . , 112NC also correspond to one another, and are located in the same place and have the same size on their respective pages; and, the sections 112AM, 112BM, 112CM, . . . , 112NM correspond to one another, and are located in the same place and have the same size on their respective pages.

All of the sections of all the pages 110 are collectively referred to as the sections 112. It is noted that in the example of FIG. 2, all the sections 112 are depicted as having the same size. For example, the section 112AA is equal in size to the sections 112AB, 112AC, 112AM, 112BA, 112BB, and so on. However, it is noted that more generally, just corresponding sections are equally sized. That is, the section 112AA is equal in size to its corresponding sections 112BA, 112CA, 112DA, 112EA, and 112NA, but is not necessarily equal in size to other, non-corresponding sections, such as the sections 112AB, 112AC, 112AM, 112BB, 112BC, and so on.

Referring back to FIG. 1, the controller 102 sends corresponding sections 112 to the halftoning mechanisms 104 to which these corresponding sections 112 correspond. Using the example of FIG. 2, for instance, the controller 102 sends corresponding sections 112AA, 112BA, . . . , 112NA to the halftoning mechanism 104A, and sends corresponding sections 112AB, 112BB, . . . , 112NB to the halftoning mechanism 104B. Likewise, the controller 102 sends corresponding sections 112AC, 112BC, . . . , 112NC to the halftoning mechanism 104C, and sends corresponding sections 112AM, 112BM, . . . , 112NM to the halftoning mechanism 104M.

The halftoning mechanisms 104 each performs halftoning on the sections 112 that the mechanisms 104 have received from the controller 102. As such, each halftoning mechanism performs halftoning on a different section of each page. Exemplary representative types of halftoning, such as exemplary representative types of error diffusion that are amenable to performance by the halftoning mechanisms 104 are described in the next section of the detailed description. However, it is noted that in general, the halftoning mechanisms 104 can each perform some types of halftoning on its corresponding sections 112 dependent upon the pixels of the corresponding sections 112 of the other mechanisms 104.

The halftoning mechanisms 104, except the last halftoning mechanism 104M, send information 114 to immediately subsequent halftoning mechanisms 104 as they complete halftoning of corresponding sections of a given page, on which basis the subsequent mechanisms 104 are to perform halftoning of their corresponding sections of the same page. Stated another way, the halftoning mechanisms 104, except the first halftoning mechanism 104A, receives information 114 from immediately preceding halftoning mechanisms 104 as these preceding halftoning mechanisms 104 complete halftoning of corresponding sections of a given page, and perform halftoning on their corresponding sections of the same page based on this received information 114. This process is now described in more detail.

Using the example of FIG. 2, for instance, for the page 110A, the first halftoning mechanism 104A performs halftoning on the section 112AA of the page 110A, resulting in the information 114A. The halftoning mechanism 104A sends the information 114A to the halftoning mechanism 104B. Upon receiving the information 114A, the halftoning mechanism 104B then performs halftoning on the section 112AB of the page 110A, resulting in the information 114B. The halftoning mechanism 104B sends the information 114B to the halftoning mechanism 104C. Upon receiving the information 114B, the halftoning mechanism 104C performs halftoning on the section 112AC of the page 110A, resulting in the information 114C. The halftoning mechanism 104C sends the information 114C to the halftoning mechanism 104M. Upon receiving the information 114C, the halftoning mechanism 104M performs halftoning on the section 112AM of the page 110A. The information 114A, 114B, 114C, and 114D are collectively referred to as the information 114.

Therefore, for a given page, it is noted that each of the halftoning mechanisms 104, except the first halftoning mechanism 104A, waits to perform halftoning on a section of the page until the mechanism has received information resulting from the immediately preceding mechanism performing halftoning on its section of the page. Likewise, for a given page, each of the halftoning mechanisms 104, except the last halftoning mechanism 104M, sends information resulting from halftoning a section of the page to the immediately subsequent mechanism so that the immediately subsequent mechanism can perform halftoning on its section of the page. Thus, at any given time, no halftoning mechanism performs halftoning on a section of the same page on which any other halftoning mechanism is currently performing halftoning.

Once a halftoning mechanism has finished performing halftoning on a section of a given page, however, it can immediately begin performing halftoning on a section of the next page. In this way, the halftoning mechanisms 104 perform parallel halftoning on the halftoning job 108. Halftoning is not performed in parallel (i.e., concurrently, simultaneously, or at the same time) by the halftoning mechanisms 104 on the sections of the same page of the halftoning job 108. Rather, halftoning is performed in parallel by the halftoning mechanisms 104 on sections of different pages of the halftoning job 108.

This inventive parallelization approach permits halftoning processes that otherwise cannot be parallelized to be parallelized. For example, as noted above, many types of halftoning process, such as many types of error diffusion, perform halftoning for a certain pixel of image data based on neighboring pixels. The problem with parallelizing such halftoning processes is that where the image data is divided into two groups, or sections, of pixels, the pixels of one group that have neighboring pixels in the other group cannot be halftoned based on these neighboring pixels, because the pixel groups are halftoned independently of and in parallel with one another.

By comparison, the inventive parallelization approach that has been described above permits such halftoning processes to be parallelized. This is because the inventors have novelly parallelized the halftoning of the halftoning job 108 effectively by page, instead of by section. That is, because at any given time at most one halftoning mechanism is currently halftoning the pixels of a given section of a given page, the halftoning of other sections of this page can be performed dependent on the halftoning results of this given section. For example, the halftoning mechanism 104B halftones the section 112AB of the page 110A based on the information 114A resulting from the mechanism 104A halftoning the section 112AA of the page 110A, the mechanism 104C halftones the section 112AC of the page 110A based on the information 114B resulting from the mechanism 104B halftoning the section 112AB of the page 110A, and so on.

Figure 3:
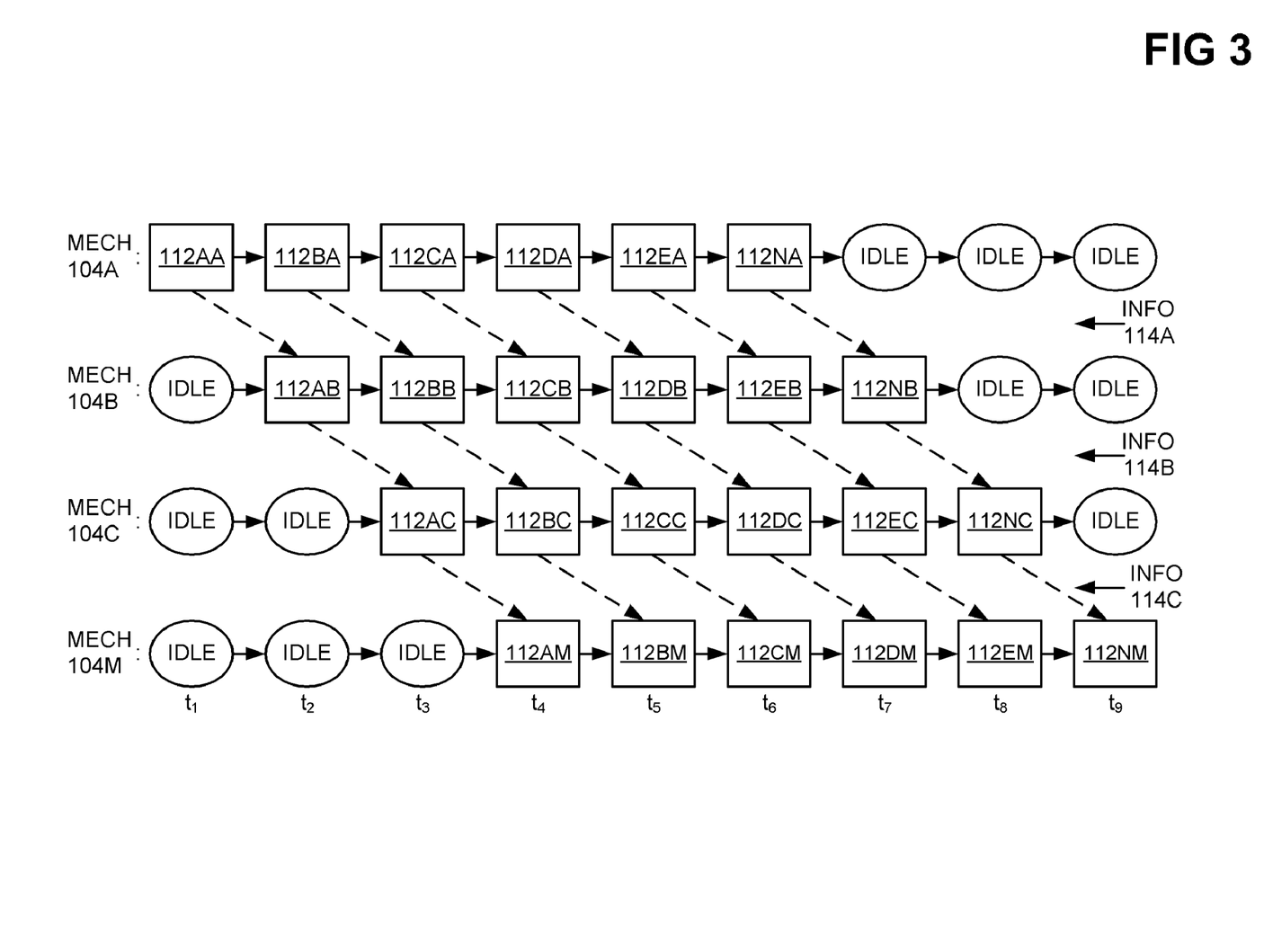
FIG. 3 is a diagram illustratively depicting the operation of the halftoning system of FIG. 1 in relation to the example of FIG. 2, according to an embodiment of the present disclosure.

FIG. 3 illustratively depicts operation of the halftoning mechanisms 104 in the example of FIG. 2, according to an embodiment of the present disclosure. The information 114 is depicted as dotted line arrows in FIG. 3. At time $t_1$, the halftoning mechanism 104A halftones the section 112AA of the page 110A, while the mechanisms 104B, 104C, and 104M are idle. At time $t_2$, the halftoning mechanism 104A halftones the section 112BA of the page 110B, the mechanism 104B halftones the section 112AB of the page 110A based on the information 114A resulting from prior halftoning of the section 112AA of the page 110A, and the mechanisms 104B, 104C, and 104M are idle.

At time $t_3$, the halftoning mechanism 104A halftones the section 112CA of the page 110C, the mechanism 104B halftones the section 112BB of the page 110B based on the information 114A resulting from prior halftoning of the section 112BA of the page 110B, and the mechanism 104C halftones the section 112AC of the page 110A based on the information 114B resulting prior from halftoning of the section 112AB of the page 110A. The mechanism 104M is idle at time $t_3$. At time $t_4$, the halftoning mechanism 104A halftones the section 112DA of the page 110D, and the mechanism 104B halftones the section 112CB of the page 110C based on the information 114A resulting from prior halftoning of the section 112CA of the page 110C. Also at time $t_4$, the halftoning mechanism 104C halftones the section 112BC of the page 110B based on the information 114B resulting from prior halftoning of the section 112BB of the page 110B, and the mechanism 104D halftones the section 112AM of the page 110A based on the information 114C resulting from prior halftoning of the section 112AC of the page 110A.

At time $t_5$, the halftoning mechanism 104A halftones the section 112EA of the page 110E, and the mechanism 104B halftones the section 112DB of the page 110D based on the information 114A resulting from prior halftoning of the section 112DA of the page 110D. Also at time $t_5$, the halftoning mechanism 104C halftones the section 112CC of the page 110C based on the information 114B resulting from prior halftoning of the section 112CB of the page 110C, and the mechanism 104D halftones the section 112BM of the page 110B based on the information 114C resulting from prior halftoning of the section 112BC. At time $t_6$, the halftoning mechanism 104A halftones the section 112NA of the page 110N, and the mechanism 104B halftones the section 112EB of the page 110E based on the information 114A resulting from prior halftoning of the section 112EA of the page 110E. Also at time $t_6$, the halftoning mechanism 104C halftones the section 112DC of the page 110D based on the information 114B resulting from prior halftoning of the section 112DB of the page 110D, and the mechanism 104D halftones the section 112CM of the page 110C based on the information 114C resulting from prior halftoning of the section 112CC of the page 110C.

At time $t_7$, the halftoning mechanism 104A is idle, and the halftoning mechanism 104B halftones the section 112NB of the page 110N based on the information 114A resulting from prior halftoning of the section 112NA of the page 110N. Also at time $t_7$, the halftoning mechanism 104C halftones the section 112EC of the page 110E based on the information 114B resulting from prior halftoning of the section 112EB of the page 110E, and the mechanism 104D halftones the section 112DM of the page 110D based on the information 114C resulting from prior halftoning of the section 112DC of the page 110D. At time $t_8$, the halftoning mechanisms 104A and 104B are idle, the mechanism 104C halftones the section 112NC of the page 110N based on the information 114B resulting from prior halftoning of the section 112NB of the page 110N, and the mechanism 104D halftones the section 112EM of the page 112E based on the information 114C resulting from prior halftoning of the section 112EC of the page 112E. Finally, at time $t_9$, the halftoning mechanisms 104A, 104B, and 104C are idle, and the mechanism 104D halftones the section 112NM of the page 110N based on the information 114C resulting from prior halftoning of the section 112NC of the page 112N.

FIG. 3 thus shows that at any given time, just one section of a given page is being halftoned by any of the halftoning mechanisms 104. Stated another way, at any given time, all the non-idle halftoning mechanisms 104 are halftoning sections of different pages. For example, at time $t_4$, the halftoning mechanisms 104 are halftoning sections of the pages 110D, 110C, 110B, and 110A, whereas at time $t_5$, the mechanisms 104 are halftoning sections of the pages 110E, 110D, 110C, and 110B. Such parallelization by page as opposed to by section of the same page permits halftoning to be performed even where the halftoning in question has dependencies between pixels of different sections of a given page.

For instance, the pixels in the section 112AB can have their halftoning dependent on the pixels in the section 112AA, because the halftoning mechanism 104B does not start halftoning the section 112AB until the mechanism 104A has finished halftoning the section 112AA and provides the information 114A. Likewise, the pixels in the section 112AC can have their halftoning dependent on the pixels in the section 112AB, because the halftoning mechanism 104C does not start halftoning the section 112AC until the mechanism 104B has finished halftoning the section 112AB and provides the information 114B. The pixels in the section 112AD can also have their halftoning dependent on the pixels in the section 112AC, because the halftoning mechanism 104D does not start halftoning the section 112AD until the mechanism 104C has finished halftoning the section 112AC and provides the information 114C.

It is noted that FIG. 3 illustratively depicts the following relationship at time $t_6$ for the example of FIG. 2, and, more generally, for the situation where there are M halftoning mechanisms 104, N pages 110, and N is greater than or equal to M. Specifically, where the first halftoning mechanism 104A is performing halftoning on the first section of the last page, the last halftoning mechanism 104M is performing halftoning on the last section of the page numbered N−M+1. As depicted in FIG. 3 in relation to the example of FIG. 2, then, at time $t_6$, the halftoning mechanism 104A is performing halftoning on the first section 112NA of the last page 110N, while the mechanism 104M is performing halftoning on the last section 112CM of the page 110C. In this example, N equals 6 and M equals 4, which means that the mechanism 104M is performing halftoning on the last section of page 6−4+1=3, or the third page, which is the page 110C.

Furthermore, FIG. 3 illustratively depicts that each of the halftoning mechanisms 104 except the first halftoning mechanism 104A is to perform halftoning on a corresponding section of a given page after the immediately preceding mechanism has performed halftoning on an immediately preceding section of this page. For example, the halftoning mechanism 104B performs halftoning on the section 112AB of the page 110A at time $t_2$, which is after time $t_1$ when the immediately preceding mechanism 104A performs halftoning on the immediately preceding section 112AA of the page 110A. More specifically, the halftoning mechanism 104B halftones on the section 112B of the page 110A based on the information 114A resulting from prior halftoning of the immediately preceding section 112AA of the page 110A by the mechanism 104A, as provided to the mechanism 104B by the mechanism 104A.

Referring back to FIG. 1, it is noted that the halftoning mechanisms 104 do not have to wait to receive their corresponding sections 112 of all the pages 110 before starting to perform halftoning. For example, the halftoning mechanism 104A can begin halftoning the section 112AA of the page 110A after receiving the section 112AA, and does not have to first wait to receive the section 112BA of the page 110B. Likewise, the halftoning mechanism 104B can begin halftoning the section 112AB of the page 110A after receiving the section 112AB (and after the mechanism 104A has finished halftoning the section 112AA and has provided the resulting information 114A), and does not have to wait to first wait to receive the section 112BB of the page 110B.

As the halftoning mechanisms 104 complete halftoning of the sections 112 of the pages 110, the mechanisms 104 in some embodiments can send the completed sections 112 to the controller 102. For example, once the halftoning mechanism 104A has completed halftoning the section 112AA of the page 110A, the mechanism 104A can send the halftoned section 112A to the controller 102. Once the last halftoning mechanism 104M has completed halftoning a section of a given page and has sent this halftoned section to the controller 102, the controller 102 will then have all the halftoned sections of a given page. For example, once the halftoning mechanism 104M has completed halftoning the section 112AM of the page 110 and has sent the halftoned section 112AM to the controller 102, the controller 102 has all the halftoned sections 112AA, 112AB, 112AC, . . . , 112AM of the page 110.

Once the controller 102 has received all the completed halftoned sections of a given page, the controller 102 can send this halftoned page to the printing mechanism 106 for printing on a sheet of media. For example, once the controller 102 has received all the halftoned sections 112AA, 112AB, 112AC, and 112AM, the halftoning of the page 110A is finished, and the controller 102 can send the halftoned page 110A to the printing mechanism 106 for printing on a sheet of media. Generally, then, in response to receiving communication from the last halftoning mechanism 104M that halftoning has been completely performed on the last section of a given page, the controller 102 transmits the halftoned page to the printing mechanism 106 for printing.

It is noted that in other embodiments, the mechanisms 104 directly send their completed sections 112 to the printing mechanism 106, in lieu of sending these completed sections 112 to the controller 102. The controller 102 in such an embodiment can receive indication from the last halftoning mechanism 104M that the last section 112 of a given page 110 has been halftoned, so that the controller 102 notifies the printing mechanism 106 that printing of this page can commence. Alternatively, the printing mechanism 106 may automatically print a given page once it has received all the completed sections 112 of this page.

Figure 4:
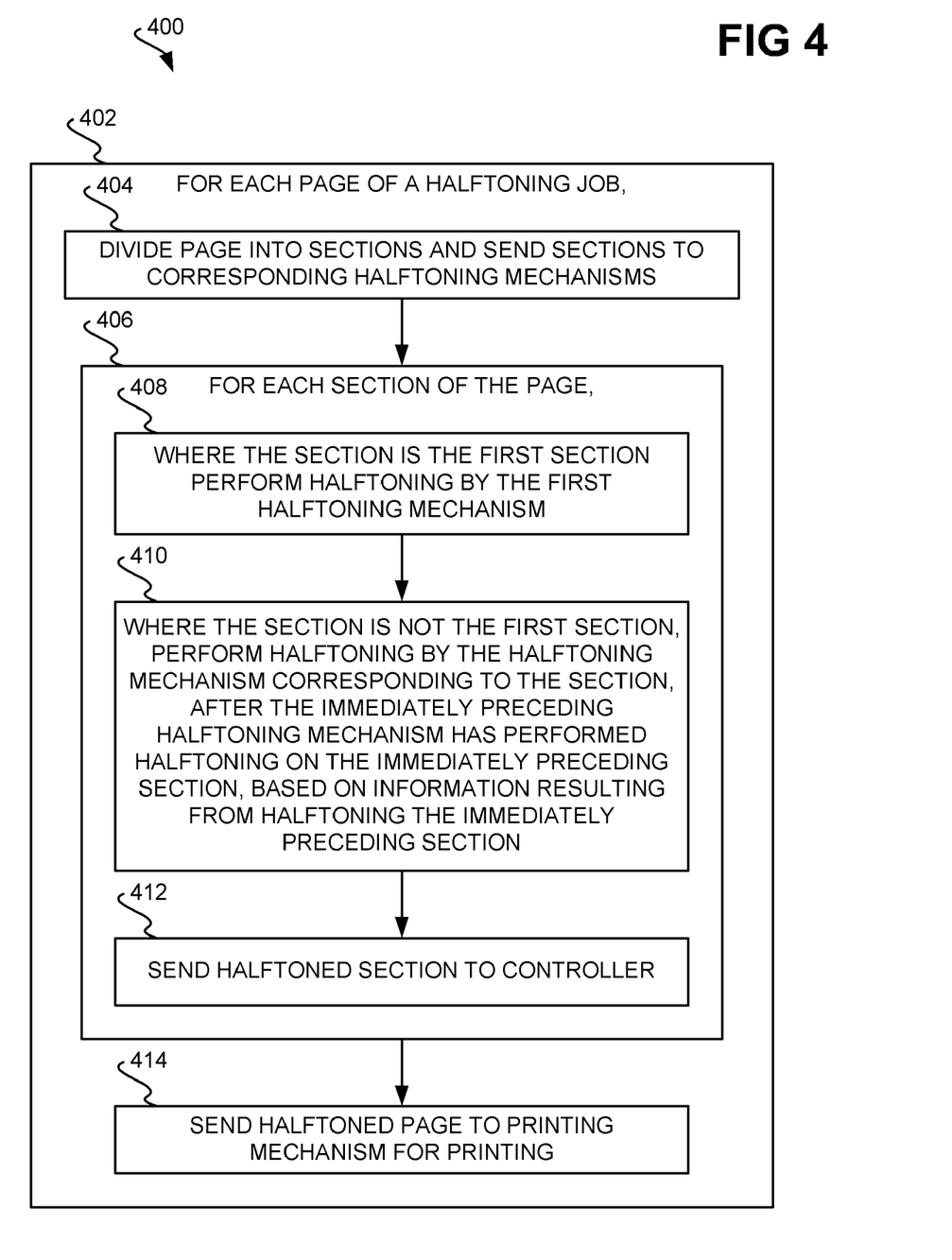
FIG. 4 is a flowchart of a halftoning method, according to an embodiment of the present disclosure.

FIG. 4 shows a halftoning method 400 that summarizes the operation of the halftoning system 100 that has been described, according to an embodiment of the present disclosure. The method 400 performs the following for each of the pages 110 of the halftoning job 108 (402), such as in order from the first page to the last page of the job 108. The controller 102 divides the page into sections, and sends the sections to the halftoning mechanisms 104 to which the sections correspond (404). Thus, each section of the page is sent to just one of the halftoning mechanisms 104.

The following is performed for each section of the page (406), in order from the first section to the last section of the page. Where the section in question is the first section on the page, then the first halftoning mechanism 104A performs halftoning on this section (408). Otherwise, the section in question is not the first section on the page, and instead the halftoning mechanism corresponding to this section performs halftoning on the section (410). Halftoning is performed in part 410 after the immediately preceding halftoning mechanism has performed halftoning on the immediately preceding section. More specifically, halftoning is performed in part 410 based on the information resulting from halftoning the immediately preceding section, as sent to the corresponding halftoning mechanism in question from the immediately preceding halftoning mechanism.

Once the section has been halftoned, the completed halftoned section can be sent from the halftoning mechanism that performed the halftoning to the controller 102 (412). Part 406 is then repeated for any other remaining sections of the page in question. Once the all the sections on the given page have been halftoned, the controller 102 can send the completed halftoned page to the printing mechanism 106 for printing (414). Part 402 is then repeated for any other remaining pages of the halftoning job 108.

Embodiments of the present disclosure are amenable to implementation with respect to backward-looking halftoning processes, as opposed to forward-looking halftoning processes. Backward-looking halftoning processes determine how to halftone a given pixel of image data of a page of a halftoning job based on the pixels of image data of the page that have already been halftoned, and not based on the pixels of image data that have not yet been halftoned. By comparison, forward-looking halftoning processes determine how to halftone a given pixel based at least on the pixels of image data of the page that have not yet been halftoned.

Figure 5:
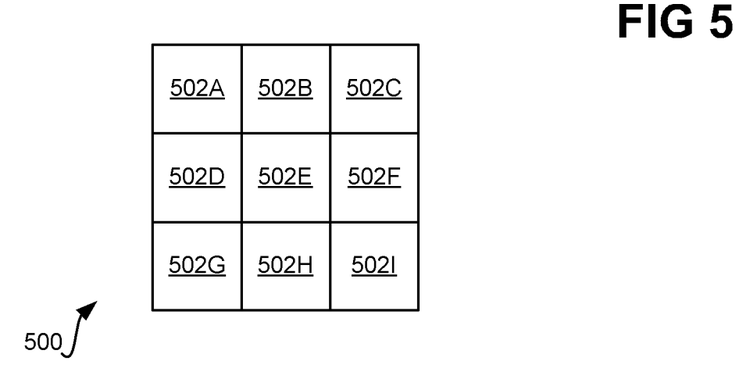
FIG. 5 is a diagram of a grid of nine pixels in relation to which exemplary halftoning is described, according to an embodiment of the present disclosure.

For example, FIG. 5 shows a grid 500 of nine pixels 502A, 502B, 502C, 502D, 502E, 502F, 502G, 502H, and 502I, collectively referred to as the pixels 502, according to an embodiment of the present disclosure. It is assumed that the pixels 502 are halftoned on a row-to-row basis, from top to bottom. In the case where the pixels 502 are halftoned in the row including the pixel 502E from left to right, then for the pixel 502E, the neighboring pixels 502A, 502B, 502C, and 502D are considered when halftoning the pixel 502E, and the neighboring pixels 502F, 502G, 502H, and 502I are not considered when halftoning the pixel 502E.

The pixels 502A, 502B, and 502C are considered in this case because halftoning is performed on a row-to-row basis, from top to bottom, such that when the pixel 502E is being halftoned, the pixels 502A, 502B, and 502C will already have been halftoned because they lie in a row previous to the row including the pixel 502E. By comparison, the pixels 502G, 502H, and 502I are not considered when the pixel 502E is being halftoned, because the pixels 502G, 502H, and 502I will not yet have been halftoned since they lie in a row subsequent to the row including the pixel 502E. Furthermore, because halftoning is being performed from left to right for the row including the pixel 502E, the pixel 502D is considered when halftoning the pixel 502E, since the pixel 502D will have already have been halftoned. The pixel 502F will not be considered when halftoning the pixel 502E, since the pixel 502F will not yet have been halftoned.

Furthermore, in the case where the pixels 502 are halftoned on a row-to-row basis, from top to bottom, but are halftoned in the row including the pixel 502E from right to left, then for the pixel 502E, the neighboring pixels 502A 502B, 502C, and 502F are considered when halftoning the pixel 502E, and the neighboring pixels 502D, 502G, 502H, and 502I are not considered. The pixels 502A, 502B, and 502C are considered because they lie in a previous row to the row including the pixel 502E, and will have already been halftoned when the pixel 502E is being halftoned. The pixels 502G, 502H, and 502I are not considered because they lie in a subsequent row to the row including the pixel 502E, and will have not yet been halftoned when the pixel 502E is being halftoned. The pixel 502F is considered because halftoning in this case is being performed from right to left for the row including the pixel 502E, and will have already been halftoned when the pixel 502E is being halftoned. The pixel 502D will not be considered when halftoning the pixel 502E, since the pixel 502D will not yet have been halftoned.

Figure 6:
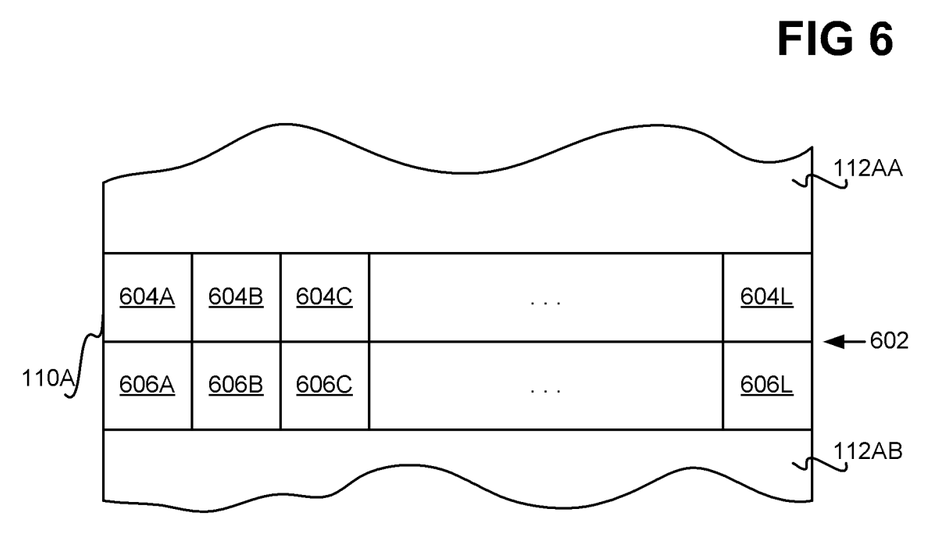
FIG. 6 is a diagram illustratively depicting two adjacent sections of a page of a halftoning job in detail, according to an embodiment of the present disclosure.

FIG. 6 shows a portion of the page 110A of FIG. 2 including portions of the sections 112AA and 112AB around the boundary 602 between the sections 112AA and 112AB, according to an embodiment of the present disclosure. FIG. 6 specifically shows the last row of pixels 604A, 604B, 604C, ..., 604L, collectively referred to as the pixels 604, of the section 112A. FIG. 6 also specifically shows the first row of pixels 606A, 606B, 606C, ..., 606L, collectively referred to as the pixels 606, of the section 112B.

In a backward-looking halftoning process, when the halftoning mechanism 104A is performing halftoning on the last row of the pixels 604 of the section 112AA, the halftoning mechanism 104A is able to perform halftoning without any information regarding the section 112AB, such as any information regarding the first row of the pixels 606 of section 112AB. As such, the halftoning mechanism 104A is able to completely perform halftoning on the section 112AA without consideration of any of the pixels of the section 112AB, such as the first row of the pixels 606. Such backward-looking halftoning is thus consistent with operation of the system 100 of FIG. 1 as has been described, since the halftoning mechanism 104A completely performs halftoning of the section 112AA before the halftoning mechanism 104B begins performing halftoning on the section 112AB.

By comparison, in a backward-looking halftoning process, when the halftoning mechanism 104B is performing halftoning at least on the first row of the pixels 606 of the section 112AB, the halftoning mechanism 104B may perform halftoning based on information regarding the section 112AA, specifically such as information regarding the last row of the pixels 604. For example, when halftoning the pixel 606B, the halftoning mechanism 104B may perform such halftoning based on the neighboring pixels 604A, 604B, and 604C of the last row of pixels of the section 112AA, consistent with the halftoning approaches described in relation to FIG. 5. As such, the information 114A that the halftoning mechanism 104B receives from the halftoning mechanism 104A may include the intensity values of at least the last row of the pixels 604 of the section 112AA. This information 114A may include the intensity values of such pixels of the section 112AA after the pixels have been halftoned.

In one type of halftoning, known as error diffusion, an error value is pushed forward after halftoning a given pixel, and this error value is considered when halftoning the next pixel. Error diffusion typically scans the pixels of a page of a halftoning job in a serpentine manner. For example, the first row of pixels of the page may be halftoned from left to right, the second row of pixels may be halftoned from right to left, and so on, until all the rows of pixels of the page have been halftoned. In the example of FIG. 6, then, if the last row of the pixels 604 of the section 112AA is halftoned from left to right, then the first row of the pixels 606 of the section 112AB are halftoned from right to left.

In this case, when the halftoning mechanism 104B begins performing halftoning, it starts with the right-most pixel 606L of the first row of pixels of the section 112AB. The information 114A may include the intensity values of at least the last row of the pixels 604 of the section 112AA, such as after the pixels have been halftoned, as before. However, the information 114A may further or alternatively include the error value resulting from the halftoning mechanism 104A halftoning the last pixel 604L of the section 112AA, which is then used by the halftoning mechanism 104B when it begins halftoning the section 112AB by halftoning the pixel 606L.

In general it is said that the information a given halftoning mechanism receives from an immediately preceding halftoning mechanism, so that the given mechanism can halftone a given section of a halftoning job page, includes information regarding the halftoning of the immediately preceding halftoning section by the immediately preceding mechanism. For example, such information can include the intensity values of the pixels of at least the last row of the immediately preceding section of the page in question. In the case where error diffusion is being performed, such information can additionally or alternatively include the error value resulting from halftoning the last pixel of the immediately preceding section of this page.

In the example of FIG. 6, then, where the halftoning mechanism 104A halftones the section 112AA before the halftoning mechanism 104B halftones the section 112AB based on the information 114A resulting from halftoning of the section 112AA, the information 114A can include either or both of the following information. First, the information 114A can include the intensity values of at least the last row of the pixels 604 of the section 112AA, which are used by the halftoning mechanism 104B to halftone at least the first row of the pixels 606 of the section 112AB. Second, the information 114A can include the error value resulting from halftoning the last pixel (either the pixel 604L or the pixel 604A depending on whether halftoning occurs on the last row of the section 112AA from left to right or from right to left) of the section 112AA, which is used to halftone the first pixel (either the pixel 606L or the pixel 606A) of the section 112AB.

Furthermore, in other embodiments, the information 114A can include the error values resulting from halftoning the last row of the pixels 604 of the section 112AA, which are used by the halftoning mechanism 104B to halftone at least the first row of the pixels 606 of the section 112AB. In such embodiments, then, halftoning a given pixel uses error values resulting from halftoning more than one prior pixels. In the example of FIG. 6, for instance, halftoning the pixel 606B may be based on the error values resulting from halftoning the pixels 604A, 604B, and 604C, as well as the error value resulting from halftoning the pixel 606A or the pixel 606C, depending on which of these two pixels was halftoned before the pixel 606B is being halftoned.

Embodiments of the present disclosure are thus generally applicable to any type of halftoning process, such as any type of error diffusion process, which is not forward-looking. This is because, for instance, the halftoning mechanism 104A performs halftoning on the section 112AA of the page 110A without any information from the sections 112AB, 112AB, and/or 112AM in the example of FIG. 2, which it would otherwise have to have to perform forward-looking halftoning. The type of information that a given halftoning mechanism sends to the immediately subsequent halftoning mechanism—such as the information 114A sent from the mechanism 104A to the mechanism 104B—is not, however, limited by embodiments of the present disclosure. However, examples of such information include intensity values of at least the last row of pixels of a given section of a halftoning job page, and/or an error value resulting from performing error diffusion on the last pixel of this halftoning job page section.

Figure 7A:
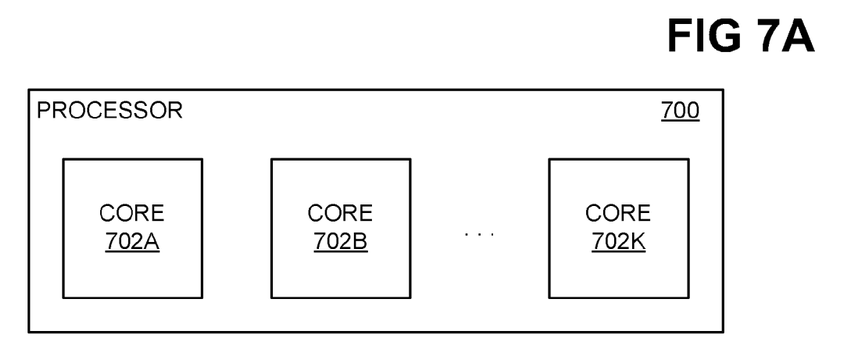
FIGS. 7A, 7B, and 7C are diagrams of exemplary representative architectural topologies in relation to which embodiments of the disclosure may be implemented.
Figure 7B:
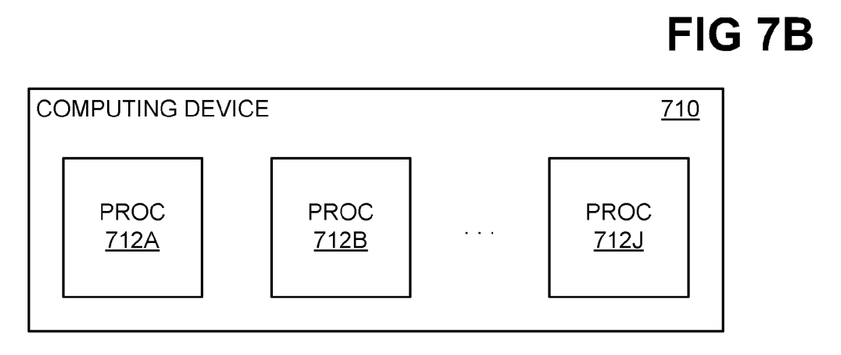
Figure 7C:
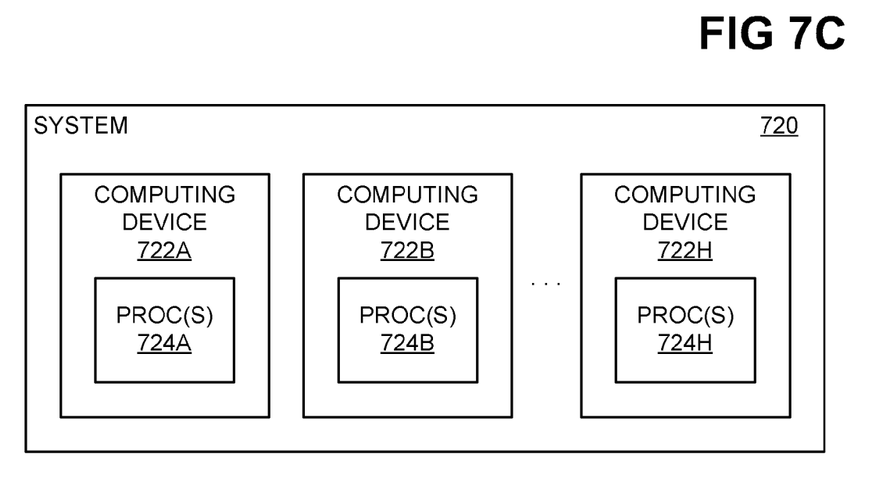

In conclusion, FIGS. 7A, 7B, and 7C depict exemplary representative architectural topologies in relation to which the halftoning mechanisms 104 of the system 100 may be implemented, according to various embodiments of the present disclosure. In FIG. 7A, a processor 700 includes a number of distinct processor cores 702A, 702B, . . . , 702K, collectively referred to as the processor cores 702. Thus, the halftoning mechanisms 104 may be assigned over the processor cores 702 of the processor 700. For example, each processor core may execute or implement a corresponding halftoning mechanism or mechanisms. The controller 102 may be assigned to its own processor core in this embodiment, or may share a processor core with one or more of the halftoning mechanisms 104. There may further be more than one processor 700.

In FIG. 7B, a computing device 710 includes a number of distinct processors 712A, 712B, . . . , 712J, collectively referred to as the processors 712. Thus, the halftoning mechanisms 104 may be assigned over the processors 712 of the computing device 710. For example, each processor may execute or implement a corresponding halftoning mechanism or mechanisms. The controller 102 may be assigned to its own processor in this embodiment, or may share a processor with one or more of the halftoning mechanisms 104. There may further be more than one computing device 710, and each of the processors 712 may have one or more processor cores.

In FIG. 7C, a networked system 720 includes a number of distinct computing devices 722A, 722B, . . . , 722H, collectively referred to as the computing devices 722, and which are communicatively connected to one another over one or more networks. Thus, the halftoning mechanisms 104 may be assigned over the computing devices 722 of the system 720. For example, each computing device may execute or implement a corresponding halftoning mechanism or mechanisms. The controller 102 may be assigned to its own computing device in this embodiment, or may share a computing device with one or more of the halftoning mechanisms 104. The computing devices 722 correspondingly include processors 724A, 724B, . . . , 724H, collectively referred to as the processors 724. Each computing device thus includes one or more processors. Each processor may have one or more processor cores as well.

We claim:

1. A system comprising:
   a controller to receive a halftoning job having a plurality of pages, the controller to divide each page into a plurality of sections; and
   a plurality of halftoning mechanisms corresponding in number to the plurality of sections into which each page is to be divided such that each halftoning mechanism to perform halftoning on a different section of each page and no halftoning mechanism is to perform halftoning on a same page on which any other halftoning mechanism is to currently perform halftoning, the sections into which each page are divided are ordered from a first section to have halftoning performed thereon to a last section to have halftoning performed thereon; and
   wherein the halftoning mechanisms are correspondingly ordered from a first halftoning mechanism to perform halftoning on the first section of each page to a last halftoning mechanism to perform halftoning on the last section of each page such that each halftoning mechanism except the first halftoning mechanism is to perform halftoning on a corresponding section of each page after an immediately preceding halftoning mechanism has performed halftoning on an immediately preceding section of the page.

2. The system of claim 1, wherein the sections of each page correspond in location and in size to the sections of each other page.

3. The system of claim 1, wherein each halftoning mechanism except for the first halftoning mechanism is to perform halftoning on a corresponding section of each page based on information provided by an immediately preceding halftoning mechanism, the information resulting from the immediately preceding halftoning mechanism having performed halftoning on an immediately preceding section of the page.

4. The system of claim 1, wherein the plurality of pages is equal to N in number, the plurality of halftoning mechanisms is equal to M in number, and the pages are ordered from a first page to a last page,
   and wherein while the first halftoning mechanism is to perform halftoning on the first section of the last page, the last halftoning mechanism is to perform halftoning on the last section of the page numbered N−M+1 where N is greater than or equal to M.

5. The system of claim 1, wherein the sections into which each page are divided comprise a last section to have halftoning performed thereon, and the halftoning mechanisms comprise a last halftoning mechanism that is to perform halftoning on the last section of each page,
   and wherein the controller is to transmit each page to a printing mechanism for printing the page on a sheet of media, in response to receiving communication from the last halftoning mechanism that halftoning has been completely performed on the last section of the page.

6. The system of claim 5, further comprising the printing mechanism.

7. The system of claim 1, wherein the halftoning mechanisms each comprise one or more of:
   a different processing core of a same processor;
   a different processor;
   a different computing device; and
   a different integrated circuit.

8. A printing device comprising:
   a controller to receive a print job having a plurality of pages including a first page and a second page, the controller to divide each page into a plurality of sections;
   a plurality of halftoning mechanisms corresponding in number to the plurality of sections into which each page is to be divided, the halftoning mechanisms include a first halftoning mechanism and a second halftoning mechanism such that the sections into which each page is divided includes a first section and a second section; and
   a printing mechanism to print the pages of the print job on sheets of media after halftoning has been performed on the pages; and
   wherein no halftoning mechanism is to perform halftoning on a same page on which any other halftoning mechanism is to currently perform halftoning and each halftoning mechanism is to perform halftoning on a different section of each page such that the first halftoning mechanism is to perform halftoning on the first section of each page and the second halftoning mechanism is to perform halftoning on the second section of each page after the first halftoning mechanism has performed halftoning on the first section of the page; and
   wherein at a first time the first halftoning mechanism is to perform halftoning on the first section of the first page while the second halftoning mechanism is idle and at a second time later than the first time the second halftoning mechanism is to perform halftoning on the second section of the first page while the first halftoning mechanism is to perform halftoning on the first section of the second page.

9. The printing device of claim 8, wherein the second halftoning mechanism is to perform halftoning on the section of each page based on information provided by the first halftoning mechanism, the information resulting from the first halftoning mechanism having performed halftoning on the first section of the page.

10. A system comprising:
    a controller to receive a halftoning job having a plurality of pages including a first page and a second page, the controller to divide each page into a plurality of sections; and
    a plurality of halftoning mechanisms corresponding in number to the plurality of sections into which each page is to be divided, the halftoning mechanisms include a first halftoning mechanism and a second halftoning mechanism such that the sections into which each page is divided includes a first section and a second section; and
    wherein at any given time, no halftoning mechanism is to perform halftoning on a same page on which any other halftoning mechanism is to currently perform halftoning and each halftoning mechanism is to perform halftoning on a different section of each page such that the first halftoning mechanism is to perform halftoning on the first section of each page and the second halftoning mechanism is to perform halftoning on the second section of each page after the first halftoning mechanism has performed halftoning on the first section of the page; and
    wherein at a first time the first halftoning mechanism is to perform halftoning on the first section of the first page while the second halftoning mechanism is idle and at a second time later than the first time the second halftoning mechanism is to perform halftoning on the second section of the first page while the first halftoning mechanism is to perform halftoning on the first section of the second page.

11. The system of claim 10, wherein the second halftoning mechanism is to perform halftoning on the section of each page based on information provided by the first halftoning mechanism, the information resulting from the first halftoning mechanism having performed halftoning on the first section of the page.

12. A method comprising:
    for each page of a plurality of pages of a halftoning job,
       dividing the page into a plurality of sections,
          where the sections correspond in number to a plurality of halftoning mechanisms,
          and where the sections are ordered from a first section to have halftoning performed thereon to a last section to have halftoning performed thereon, and the halftoning mechanisms are correspondingly ordered from a first halftoning mechanism to perform halftoning on the first section to a last halftoning mechanism to perform halftoning on the last section;
       for each section of the plurality of sections into which the page has been divided, in order from the first section to the last section,
          where the section is the first section, performing halftoning on the first section by the first halftoning mechanism; and,
          where the section is other than the first section, performing halftoning on the section by the halftoning mechanism corresponding to the section, after an immediately preceding halftoning mechanism has performed halftoning on an immediately preceding section includes performing halftoning on the section based on information resulting from the immediately preceding halftoning mechanism having performed halftoning on the immediately preceding section,
    wherein at any given time, no halftoning mechanism is performing halftoning on a same page on which any other halftoning mechanism is currently performing halftoning.

13. The method of claim 12, wherein the plurality of pages are equal to N in number, the plurality of halftoning mechanisms are equal to M in number, and the pages are ordered from a first page to a last page,
    and wherein where N is greater than or equal to M, and while halftoning is being performed on the first section of the last page by the first halftoning mechanism, halftoning is being performed on the last section of the page numbered N−M+1 by the last halftoning mechanism.

* * * * *